United States Patent [19]
Bender et al.

[11] Patent Number: 4,919,897
[45] Date of Patent: Apr. 24, 1990

[54] GAS GENERATOR FOR AIR BAG
[75] Inventors: Richard Bender, Lauf; Gerrit Scheiderer, Furth, both of Fed. Rep. of Germany
[73] Assignee: Dynamit Nobel Aktiengesellschaft, Troisorf, Fed. Rep. of Germany
[21] Appl. No.: 197,272
[22] Filed: May 23, 1988
[30] Foreign Application Priority Data
May 22, 1987 [DE] Fed. Rep. of Germany ....... 3717249
Dec. 16, 1987 [DE] Fed. Rep. of Germany ....... 3742656
[51] Int. Cl.$^5$ ............................................ B60R 21/26
[52] U.S. Cl. ..................... 422/165; 102/530; 280/731; 280/736; 422/166; 422/305
[58] Field of Search ............... 422/164, 165, 166, 167, 422/305; 102/530, 531; 280/731, 736, 737, 740, 741

[56] References Cited
U.S. PATENT DOCUMENTS 3,813,112  5/1974  Hermann .............................. 422/165
3,878,969  4/1975  Prochazka et al. ................. 280/741
3,964,394  6/1976  Wolf ..................................... 422/166
4,578,247  3/1986  Bolieau ................................ 422/166
4,796,912  1/1989  Lauritzer et al. ................... 422/166

Primary Examiner—Peter Kratz
Attorney, Agent, or Firm—Antonelli, Terry & Wands

[57] ABSTRACT

A gas generator for an air bag, which can be manufactured in an advantageous manner, has at least two tubular pressure tanks wherein materials that release gas are combusted. The pressure tanks are connected radially with a central member containing an igniter element. The gas-releasing material fills up a tubular interior extensively in the form of stackable molded elements adapted to fit within the pressure tank. In most cases, an adequate path for the ignition vapors is constituted by a central channel within each element, while in case of rod-shaped molded elements, such adequate path is represented by the "natural" cavities; additionally, a free surface area should exist between the elements and may be provided by nubs and/or indentations on the lateral faces of these molded elements.

9 Claims, 4 Drawing Sheets

GAS GENERATOR FOR AIR BAG

This invention relates to a gas generator for an air bag useful as a safety system in vehicle. In particular, this invention is directed to a gas generator for an air bag comprising a plurality of pressure tanks in communication with an igniter element wherein, after initiation of the igniter element, a gas-releasing material is burnt up in the pressure tanks and the resulting gas flows through filter-covered apertures in the walls of the pressure tanks into an air bag arranged in fluid communication with the tanks.

In the safety system for vehicle occupants known as an air bag, a gas generator is triggered if a collision sensor detects rapid deceleration; this gas generator inflates an expansible sheath or envelope which retains or cushions the vehicle occupant. Normally, the gas generator with air bag is arranged, for the driver of the vehicle, in the steering wheel and for the front seat passenger, in the dashboard.

Various systems of gas generators and descriptions regarding the respective advantages or disadvantages can be derived, for example, from DOS Nos. 2,364,268; 2,551,920; EP Nos. 17 736 B1; and 180, 408 A1. In all of these systems, hot particles formed during combustion must be filtered out of the gas stream so that the hot particles do not pass directly into the air bag. Two essentially cylindrical forms of gas generators have evolved; a disk-shaped type with a considerably larger diameter than the height of a cylinder shell, and an oblong type having a considerably smaller diameter than the height of the cylinder shell.

In the first form, an igniter element is located centrally in a pressure tank. The agent that generates gas during combustion is distributed in an annular chamber around a central igniter element. The propellant for releasing or generating gas is press-molded in the form of tablets pellets or granules and does not fill up the space entirely. Thereby, sufficient channels are present for the ignition vapors. There is the disadvantage of abrasion on the packed material. The gas outlet apertures are located on the outside of the cylinder shell surface. Such a gas generator is very expensive with respect to manufacturing technique. In the second form, the igniter element is also in most cases arranged centrally axially within a pressure tank, and the space around the igniter element is likewise filled up with the solid pieces of propellant. Here again, the gas outlet apertures are arranged on a cylinder shell surface, but ordinarily only in a smaller sector.

The housings of the aforementioned gas generators are difficult to produce and assemble. For reasons of weight and savings of material, a maximally thin-walled housing is a necessity, but, on the other hand, such housing requires additional rigidifying means. Frequently, filter chambers are provided upstream of the filters at the gas outlet apertures. The complicated and expensive manufacturing steps constitute a serious disadvantage for large-scale production.

This invention is based on the object of providing a gas generator that is simple to manufacture and that will avoid known drawbacks to a maximum extent.

This object has been attained by a gas generator which is characterized in that at least two tubular pressure tanks, containers, or chambers are attached radially to a central member containing an igniter element, the gas-releasing combustible material, in the form of stackable press-mold disks or pellets, approximately fill up the tubular cross-section of each pressure tank in a column-like packing, and at least one gas channel is present in each column-like packing.

The expression "attached radially" is meant also to encompass an important embodiment of the invention wherein two tubular containers in opposed relationship are attached to the central member, which can be of advantage especially for an air bag that is not made rotationally symmetrical.

The expression "attached radially" is to also characterize a unilateral type of mounting of the pressure tanks to the central member, rather than indicating a radial symmetry. In case of steering wheels of modern design in automobiles, in particular, it may become necessary to adapt the position and length of the pressure tanks to the space available.

The pressure tanks need not absolutely be disposed in one plane; rather, the tanks can also spread out into a conical surface, for example. If the available space has, rather, a rectangular basal surface, then mirror-image symmetry is preferred, more than rotational symmetry.

Advantageous embodiments are described in the following detailed description of the invention.

It is especially advantageous to provide, instead of a relatively large pressure tank or chamber of a complicated shape, at least two smaller, tubular pressure chambers (in the normal case, linear circular cylinders). This configuration, advantageous for strength and for manufacture, also permits in a simple way an optimum arrangement of a combustible gas generating or releasing propellant in the form of stackable press-molded elements.

In this arrangement —as basically known to those skilled in the art —channels must be present for the ignition vapors in dependence on the type of propellant and the quantity thereof. For example, a central bore is particularly preferred for elements in the form of disk-shaped moldings.

In the gas generators according to this invention, a minimum volume of the pressure tanks is achieved because the propellant, due to the column-like arrangement of the stackable moldings, is present in the densest packing possible.

It is understood that, for example, in case of a square cross-section of the tubular tank, disk-shaped moldings would have to exhibit a square configuration, or that rod-shaped moldings (which can also be extruded) can be half the length of the pressure tank, for example.

In round, rod-shaped moldings ("powder bars"), which ordinarily extend the entire length of the pressure tank, an adequate number of "natural" gas channels is already created by the unavoidable gussets between the holdings.

The column-like arrangement of the gas-releasing combustible material in the pressure housing also results in less abrasion than in case of the conventional "bulk" arrangement. On account of the required long functional readiness of, for example, 10 years or longer, it is very important that the propellant is not too greatly pulverized by the constant vibrations. It is to be avoided that such an amount of powder is formed which brings about an explosion during ignition. In the device of this invention, the wall thickness of the pressure tank can be designed with the assumption of an orderly deflagration of relatively large solid bodies. The proposed arrangement ensures for a long period of time that the surface of the propellant is not substantially altered, and the network of channels remains optimally preserved.

It is known of propellant charge igniters in mortar shells, for example, that the propellant charge disks placed on the shank of the shells are to exhibit a minimum mutual spacing, and therefore nubs are present, for example, on the disks whereby clearly a certain gas space remains vacant between the disks at all times. Similar measures are also possible and practical in the gas generators of the present invention.

Also rod-shaped molded items could be equipped with spacers to enlarge their mutual spacings.

Another, very advantageous measure resides in encasing the stackable moldings with a shrunk-on sleeve or other reinforcing envelopes (e.g. mesh-like ones), and then inserting the package in the pressure tank. This simplification of the manufacturing process additionally brings the advantage that the moldings are held together and abrasion can be further reduced. Consequently, changes in deflagration characteristic also remain at a low level over long periods of time.

The invention is illustrated in the drawings and will be described hereinbelow by way of the following embodiments. In the drawings.

Figure 1:
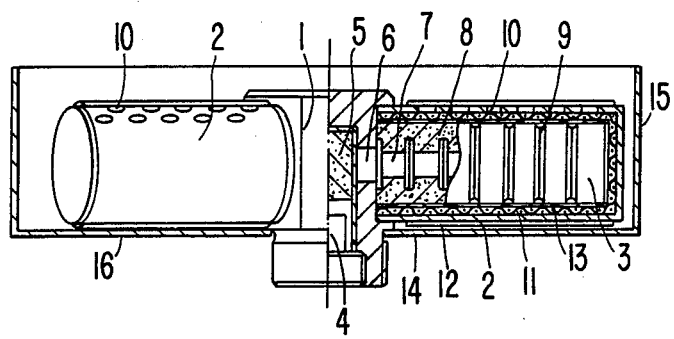
FIG. 1 shows a gas generator with three pressure tanks arranged in one plane, in a lateral view, partially in section.

The gas generator according to this invention consists of a central member 1, at least two tubular pressure tanks or containers attached radially to the central member and extensively filled up with a gas-producing material (propellant) in the form of a plurality of disk-shaped moldings 3 and a baffle housing 14 secured to the central member.

An igniter element 4 with a booster charge 5 is accommodated in the central member 1. Upon electrical initiation by means of an acceleration sensor (not shown) located in the vehicle or in the gas generator, the rapid combustion of the gas-producing moldings 3 in each of the pressure tanks 2 is induced via apertures 6 in the central member. The central member thus operates as a distributing means for introducing ignition gases into each of the gas generating pressure tanks.

Figure 5:
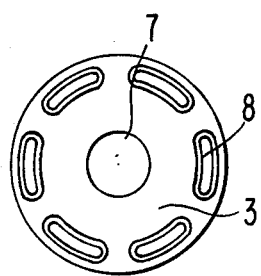
FIG. 5 shows a disk-shaped molded combustible element in a top view.
Figure 6:
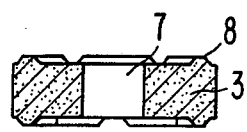
FIG. 6 shows the disk-shaped molded element of FIG. 5 in a sectional view.

In this embodiment, each disk-shaped molding 3 has a central bore 7; thus, it is assured in a simple way that in all cases a channel is present, and this channel need not be overly dimensioned, either, since the cross section cannot decrease. FIGS. 5 and 6 illustrate the disk-shaped molding in greater detail; the molding has a central bore 7, as well as on each side projecting nubs 8 whereby a spacer zone 9 can be created between the disk-shaped moldings 3 in order to attain optimum combustion of the moldings 3.

In order to control the speed of deflagration and thus the desired pressure buildup, a person skilled in the art has the possibility of varying numerous parameters, such as the chemical composition, number, thickness, and length of the moldings, size of the central bore and the number and shape of the nubs. The pressure buildup in the air bag is also determined by the number, diameter and arrangement of outlet apertures 10 provided in the cylinder shell surface of each of the pressure tanks 2. A filter unit 11 is mounted within each tank 2 between the disk-shaped moldings 3 and the apertures 10. The filter unit 11 may comprises a perforated metal tube or a cylindrical screen made up of wire or gauze. Details of the filter unit 11 are hereinafter described with reference to FIG. 9.

The tubular pressure tanks 2 are tightly enclosed by a cover film 12 of thermoplastic material. Also the aperture characteristic of this cover film affects the pressure buildup in the air bag additionally.

It is especially advantageous to pack all the disk-shaped moldings of one tube into a synthetic resin shrunk-on sleeve 13. Handling is facilitated and abrasion still further reduced.

Figure 2:
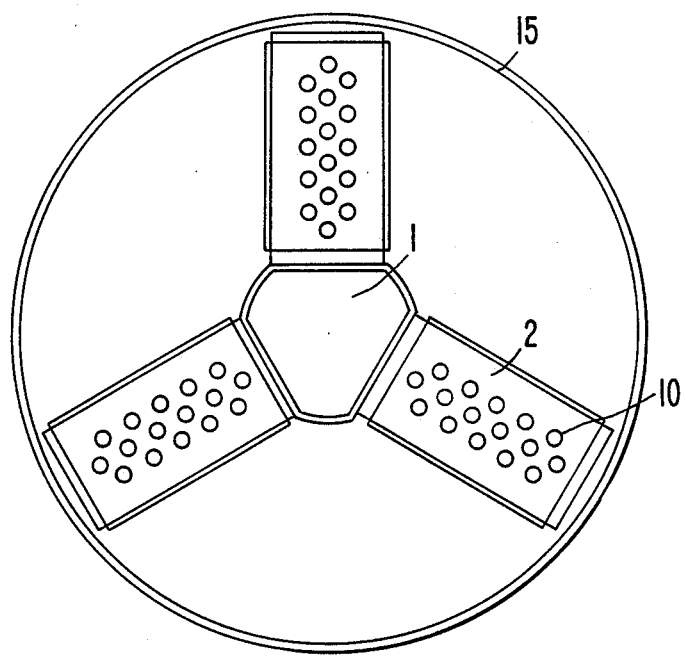
FIG. 2 shows the gas generator of FIG. 1 in a top view.

The gas generator illustrated in FIGS. 1 and 2 has been conceived for installation in the steering wheel of a vehicle. Therefore, the apertures 10 in the tubular pressure tank 2 are arranged only in an upper zone. Additionally, the baffle housing is arranged to enclose a lower portion of each of the tanks 2. Generally the baffle housing has a side wall 15 that extends upwardly around the outer extremities of the tanks 2 and the baffle housing has a lower wall 16 connected to a lower portion of the central member to provide a protective housing for the tanks 2 and the central member and to provide a baffle for directing gases into an air bag inverted over the gas generator. The air bag may be secured to the side wall 15. The air bag can be mounted to the baffle housing of the gas generator in a simple way.

Figure 3:
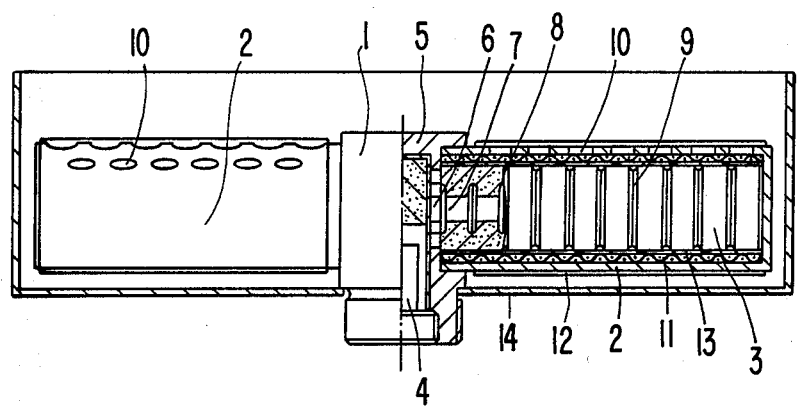
FIG. 3 shows a gas generator with two tanks arranged in a straight line, in a lateral view, partially in section.
Figure 4:
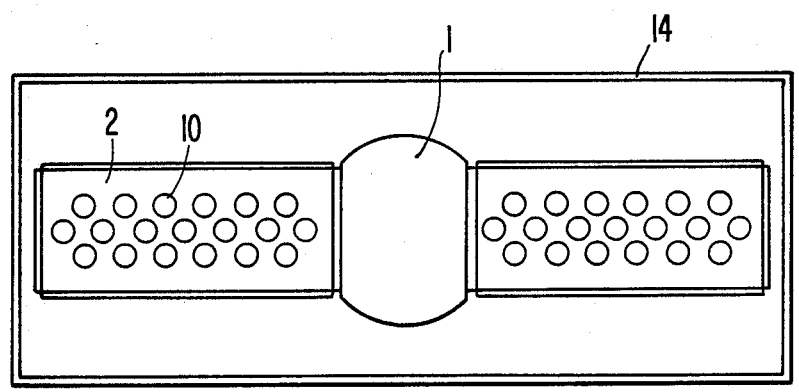
FIG. 4 shows the gas generator according to FIG. 3 in a top view.

A gas generator having two tubular pressure tanks arranged linearly on opposite sides of the central member is shown in FIGS. 3 and 4. This gas generator is also suited for installation in a steering wheel, but installation on the front passenger's side is preferred. Parts identical in function bear the same reference numerals as in FIGS. 1 and 2.

One of the disk-shaped moldings of the gas generating material is shown in greater detail in FIGS. 5 and 6. The shape and the size of the moldings are adapted to the internal diameter of the tubular pressure tank 2. An inner bore 7 is, in many instances, adequate for rapid, uniform ignition. The packaging of such disk-shaped moldings into a shrunk-on sleeve contributes toward shock insensitivity, facilitates assembly, and reduces abrasion.

Figure 7:
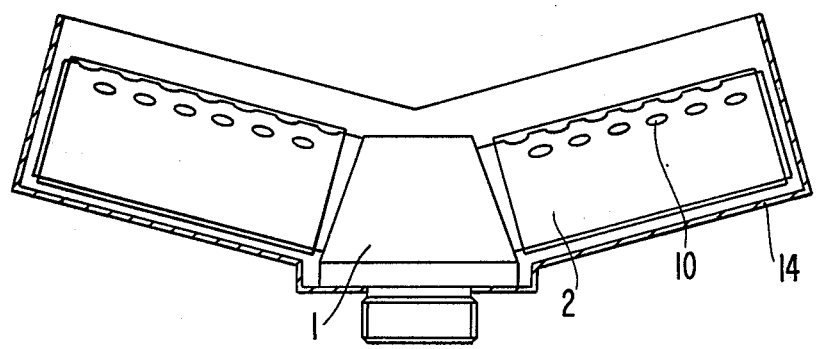
FIG. 7 shows a gas generator with two pressure tanks for installation into a kidney-shaped space in a steering wheel, in a top view.
Figure 8:
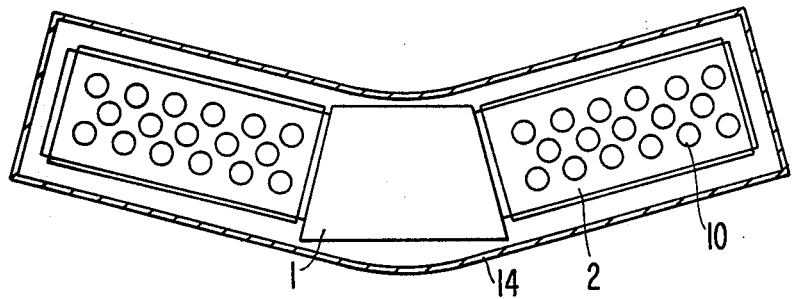
FIG. 8 shows a gas generator in a lateral view for installation into a steering wheel that is to have an indentation in the center.

The arrangement of the pressure tanks 2 at the central member in FIGS. 7 and 8 is to demonstrate that the space in the steering wheel need not necessarily be cylindrical; rather, the gas generator can be adapted to a kidney-shaped or conical space determined primarily by esthetic considerations.

Suitable compositions for the moldings of combustible material for generating gas to inflate the air bag are known per se; a composition containing a mixture of, for example, about 57% NaN23, 18% KNO3, and 24% SiO2 is especially effective.

Figure 9:
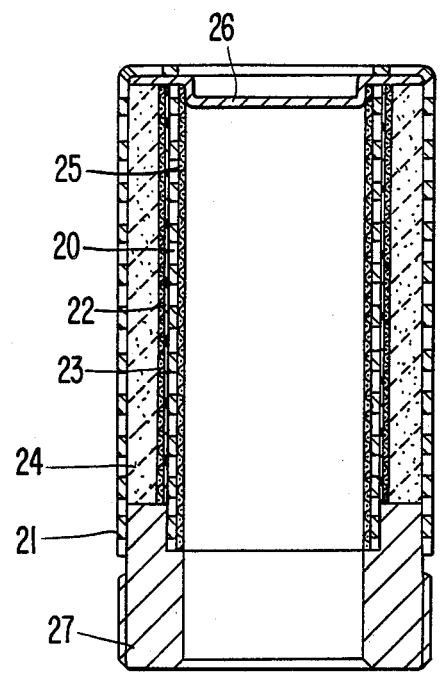
FIG. 9 shows an embodiment of the filter unit suitable for this invention.

Filter unit 11, as shown in FIG. 9, is a concentric double-tube system with one tube slid concentrically over the other (see attached sketch). Between perforated tubes 20 and 21 is the filter unit consisting of (from the inside to the outside): a protective film 22 (moisture protection), a piece of large-mesh wire cloth 23, a ceramic fiber filter unit 24 (preferably consisting of aluminum oxide ceramic in various fiber thicknesses and winding densities). For better distribution of the reactants produced by the reaction, another wire cloth screen 25 is provided additionally at the inner wall of perforated tube 20. This cloth cylinder 25 is preferably formed such that it provides a springy support function for the propellant tablet column. The end of the filter unit is closed by a lid 26. A metal ring 27 serves as a support for the filter unit, and is welded to tubes 20 and 21.

What is claimed is:

1. A gas generator for an air bag, comprising a plurality of pressure tanks in communication with an igniter element wherein, after initiation of the igniter element, a gas-releasing material is burnt up in the pressure tanks and the gas flows through filter-covered apertures in the wall of the pressure tanks into an air bag inverted thereover, characterized in that at least two tubular pressure tanks are attached radially to a central member containing the igniter element, the gas-releasing material, in the form of stackable moldings in each tank, substantially fill out a tubular cross section of the tank and are arranged to form a columnar packing, and at least one gas channel is present in each columnar packing.

2. A gas generator according to claim 1, characterized in that the tubular pressure tanks are made to be identical, and are attached to the central member in a rotationally symmetrical or mirror-symmetrical way.

3. A gas generator according to claim 1, characterized in that each tubular pressure tank is a circular cylinder.

4. A gas generator according to claim 2, characterized in that each tubular pressure tank is a circular cylinder.

5. A gas generator according to claim 1, characterized in that the stackable moldings each have a disk-shaped form and have a diameter adapted to fit the cross section of each pressure tank.

6. A gas generator according to claim 5, characterized in that a central bore is provide in each of the disk-shaped moldings.

7. Gas generator according to claim 5, characterized in that knubs are arranged on the disk-shaped molding, by means of which interspaces are formed between the disk-shaped moldings.

8. Gas generator according to claim 1, characterized in that the stackable moldings are rod shaped.

9. Gas generator according to claim 1, characterized in that the columnar packing of the stackable moldings in encased by a shrunk-on sleeve or other reinforcing cover.

* * * * *